2,878,705
TOOL POST

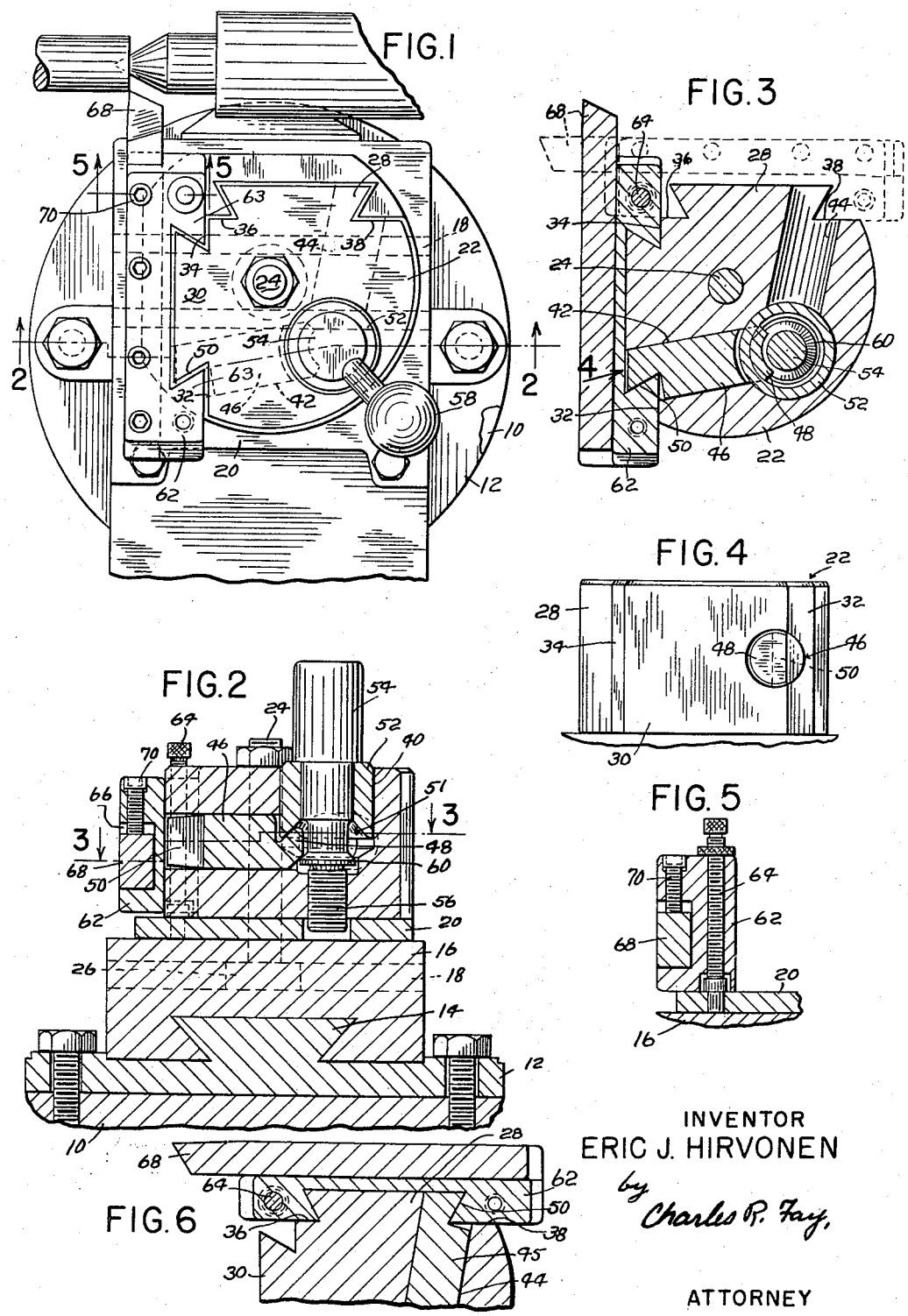
March 24, 1959     E. J. HIRVONEN     2,878,705
TOOL POST
Filed Oct. 20, 1955
INVENTOR
ERIC J. HIRVONEN
by Charles R. Fay,
ATTORNEY

Eric J. Hirvonen, Worcester, Mass., assignor to Leland-Gifford Company, Worcester, Mass., a corporation of Massachusetts Application October 20, 1955, Serial No. 541,591

1 Claim. (Cl. 82—36)

This invention relates to a new and improved tool post or tool holder in general, and the principal object of the present invention resides in the provision of a device of the class described which holds an adjustable tool, as for instance for lathe work, more precisely so that inaccuracies due to the wear are obviated; the provision of a tool post having a plurality of clamping faces thereon and a tool holder clamp to hold the tool or tool holder in different positions for different kinds of work and embodying a single means for operating the tool holder clamp in any of the positions while still retaining the precision tool clamping and other advantages of the invention.

Other objects and advantages of the invention will appear hereinafter.

Reference is to be had to the accompanying drawings, in which—

Fig. 1 is a plan view with parts broken away illustrating the invention;

Fig. 2 is a section on line 2—2 of Fig. 1;

Fig. 3 is a section on line 3—3 of Fig. 2;

Fig. 4 is a view in front elevation of the tool post with the tool holder removed and looking in the direction of arrow 4 in Fig. 3;

Fig. 5 is a section on line 5—5 of Fig. 1; and

Fig. 6 is a partial sectional view illustrating the tool holder applied to a different clamping face.

In carrying out the present invention, the tool post or head may be mounted in any convenient way such as on a plate or disc 10 which may form part of an indexing device as is well known in the art. The plate 10 has bolted thereto a superposed plate 12 provided with a dovetail slide 14. A block 16 has a complementary dovetail for sliding with respect thereto for diametrical adjustment of the tool post on the plate 12; and the block 16 is provided with a transverse T slot indicated at 18.

Mounted on block 16 is a plate 20 serving as a support for the tool post or head 22 and a through bolt 24 having a head 26 slidably located in the T slot 18 may be utilized to clamp the post 22 in adjusted position with respect to the block 16.

The tool post or head 22 is provided with a plurality of dovetail tenons, these being indicated at 28 and at 30. These tenons are arranged parallel to the axis of the tool post or head and are at angles to each other as shown. There maybe as many of these tenons as may be required and the angular relationship thereof may be varied if desired.

At each side of each dovetail tenon, the tool post 22 is provided with flat accurate clamping and positioning surfaces which are indicated at 32 and 34 as one pair and 36 and 38 as another pair, these surfaces being coplanar in pairs and serving as positioning surfaces for the precise positioning of the tool holder to be described.

The tool post or head 22 is provided with a substantially circular recess or bore 40 which extends downwardly from the top thereof to a midway position, see Fig. 2. Extending radially therefrom there are a pair of bores or passages which are indicated at 42 and 44, and these passages intersect tenon 30 and surface 32 as by the bore 42, and the bore 44 intersects tenon 36 and surface 38.

Each bore 42 and 44 provides for reception of a movable clamping plug-like member 46 which is axially movable in its bore. The clamping member 46 is provided with a flat forward surface 48 having an undercut portion at 50 which forms a jaw which is essentially in extension of the inclined side of the dovetail 30. The surface 48 is parallel with the flat surface of the tenon.

At the opposite end of the movable clamping member 46, the same is provided with an upwardly-extending nose 48 of arcuate form. This nose has an upper inclined surface as clearly shown in Fig. 2, and this inclined surface is wedgingly engaged with an interior or conical surface 51 at the lower end of a sleeve 52 located in the recess 40. With downward pressure applied to the sleeve 52, the clamping member 46 will be drawn to the right in Fig. 2.

In order to supply this pressure to the sleeve 52, a manually-actuated pin 54 passes through the sleeve 52 and has a threaded end engaged with corresponding threads in the head. The pin is translated vertically upon rotation by a handle 58. A ring 60 engages an inclined lower surface of the nose 48 in order to move the clamping member 46 to the left in case it becomes wedged.

The tool holder is illustrated at 62 and it is provided with a mortise dovetail slide 63 complementary to the tenon dovetail slide 30 and it may be positioned adjustably thereon. An adjusting screw 64 is provided in slide 63 nearest the point of the tool for this purpose, this screw passing through the tool holder and bearing on the block 16. The tool holder is recessed at 66 to receive the tool 68 and the latter is clamped by means of screws or the like 70.

Assuming that the clamping member 46 is loose, the tool holder is applied to the dovetail tenon slide 30 by sliding on the mortise 63, and of course this includes application thereof to the surface 50 of the clamping member 46. Upon turning the handle 58 in a clockwise direction in Fig. 1, the wedging surfaces of the sleeve 52 and the nose 48 are engaged and as the sleeve descends due to the action of screw threads 56, the clamping member 46 is drawn inwardly to the right as in Figs. 1 and 2. This clamps the tool holder 62 to tool holder positioning faces 32 and 34, so that the tool holder is positioned on these precision faces rather than by the dovetail surfaces.

To use tenon 28, a left-hand clamping member 45 may be inserted in bore 44 and is engaged by the sleeve 52 which serves to move the clamping member 45 as described above as to member 46.

After usage, the dovetail slides wear and would make for inaccuracy and poor clamping in prior art devices where the dovetail itself is depended upon as a clamping surface as for instance where the tool holder is moved away from the post to clamp the same by means of the dovetail surfaces. In the present case regardless of wear of the dovetails, the precisioning surfaces will hold and clamp the tool holder accurately at any tenon for angular repositioning of the tool. The adjusting screw 64 being located opposite the work as respects the tool 68, and adjacent thereto, so that the pressure of the cut on the tool does not tend to bend the screw, and the alignment of this screw is always maintained, the resultant of the radial cutting force, the feed thrust, and the tangential force passes through the base of the screw 64 in the plate 20, and not through the threaded portion thereof.

Having thus described my invention and the advantages thereof, I do not wish to be limited to the details herein disclosed, otherwise than as set forth in the claim, but what I claim is:

In a tool post, the combination of a supporting head provided with a vertical bore having a screw-threaded lower portion and a counterbored upper portion, a vertical dovetailed tenon provided at one side of said head, a tool holder provided with a complemental dovetailed slide in operative engagement with said tenon, said head also being provided with a horizontal passage extending from the counterbored portion of said bore to one dovetail of said slide, an elongated clamping member slidable inwardly and outwardly in said passage, a jaw provided at the outer end of said clamping member and engaging said one dovetail of said slide for clamping said holder against said one side of said head when said clamping member is slid inwardly in said passage, an upturned nose provided at the other end of said clamping member and having inclined upper and lower surfaces, a vertical actuating pin rotatably positioned in said bore and projecting above said head, said pin having a screw-threaded lower portion engaging the screw-threaded portion of the bore whereby the pin is moved axially during its rotation, a sleeve secured to said pin and disposed in the counterbored portion of said bore, said sleeve having an upwardly and inwardly bevelled lower edge in operative engagement with the inclined upper surface of said nose whereby said clamping member may be slid inwardly in said passage to clamp said tool holder against the head, and a ring secured to said pin below said sleeve and having an upwardly and inwardly bevelled edge in operative engagement with the inclined lower surface of said nose whereby said clamping member may be slid outwardly in said passage to unclamp the tool holder from said head.

References Cited in the file of this patent

UNITED STATES PATENTS

| | | |
|---|---|---|
| Re. 21,833 | Jackson | June 17, 1941 |
| 2,472,255 | Kyle | June 7, 1949 |
| 2,482,041 | Tiefenbacher | Sept. 13, 1949 |
| 2,621,396 | Gracchi | Dec. 16, 1952 |
| 2,716,799 | Bader | Sept. 6, 1955 |
| 2,730,918 | Daugusta | Jan. 17, 1956 |
| 2,755,758 | Johansen | July 24, 1956 |

FOREIGN PATENTS

| | | |
|---|---|---|
| 61,200 | France | Mar. 24, 1955 |
| 434,059 | Italy | Apr. 21, 1948 |
| 893,943 | France | Nov. 14, 1944 |
| 973,098 | France | Sept. 6, 1950 |
| 1,051,596 | France | Jan. 18, 1954 |
| 1,091,194 | France | Apr. 7, 1955 |